United States Patent [19]

Fujita et al.

[11] Patent Number: 4,968,776

[45] Date of Patent: Nov. 6, 1990

[54] SIZING AGENT FOR GLASS FIBERS

[75] Inventors: Takeshi Fujita, Uji; Tadayuki Sugimoto; Kazuyo Aketa, both of Kyoto, all of Japan

[73] Assignee: Dai-Ichi Kogyo Seiyaku Co., Ltd., Kyoto, Japan

[21] Appl. No.: 426,330

[22] Filed: Oct. 24, 1989

[30] Foreign Application Priority Data

Oct. 28, 1988 [JP] Japan .................................. 63-2742980

[51] Int. Cl.$^5$ ............................................. C08G 63/02
[52] U.S. Cl. ..................................... 528/272; 528/274; 528/283; 528/291; 528/296; 528/297; 528/300; 528/305; 528/308; 528/308.6; 524/310; 524/591; 524/610; 524/760; 524/773; 524/878; 428/268; 428/283; 428/378; 428/480
[58] Field of Search ............... 528/272, 274, 283, 291, 528/296, 297, 300, 305, 308, 308.6; 524/310, 591, 610, 760, 773, 878; 428/283, 268, 378, 480

[56] References Cited

U.S. PATENT DOCUMENTS

| | | | |
|---|---|---|---|
| 3,920,596 | 11/1975 | Furukawa et al. | 428/290 |
| 3,923,708 | 12/1975 | Furukawa et al. | 428/288 |
| 4,009,132 | 2/1977 | Furukawa et al. | 524/310 |
| 4,067,835 | 1/1978 | Takamori et al. | 524/773 |
| 4,477,525 | 10/1984 | Login | 428/395 |
| 4,530,876 | 7/1985 | Brodmann et al. | 428/283 |

*Primary Examiner*—John Kight, III
*Assistant Examiner*—Sam A. Acquah
*Attorney, Agent, or Firm*—Morgan & Finnegan

[57] ABSTRACT

The sizing agent according to the present invention contains as the essential component a high molecular compound having an weight-average molecular weight of not less than 20,000 prepared by reacting (A) a polyhydroxy compound having an weight-average molecular weight of not less than 1,000, which is prepared by an addition polymerization of ethylene oxide or alkylene oxides comprising ethylene oxide to an organic compound having two active hydrogens, with (B) a polycarboxylic acid, a polycarboxylic acid anhydride or a lower ester of a polycarboxylic acid.

4 Claims, No Drawings

SIZING AGENT FOR GLASS FIBERS

BACKGROUND OF THE INVENTION

This invention relates to a sizing agent or binder for glass fibers.

As conventional sizing agents for glass fibers, there have been proposed many materials such as starch, modified starch, dextrin, amylose, carboxymethyl cellulose, polyvinyl alcohol and the like.

However, such a conventional sizing agent for glass fibers, for example starch, requires a long time to prepare an useful solution. Further, the solution is poor in stability.

Carboxymethyl cellulose, polyvinyl alcohol and the like have the problem that they are hardly decomposed during the thermaly removing process and resultantly deoiling becomes incomplete or a long time treatment is required to completely decompose them.

The object of the present invention is to solve such a problem and to provide a sizing agent for glass fibers, which is easily dissolved in water and can be decomposed in the deoiling process at a relatively low temperature for a short time.

Further, the object of the present invention is to provide a sizing agent for glass fibers, which has a superior film forming ability and gives a film easily even under highly humid condition to prevent abrasion between the filaments.

SUMMARY OF THE INVENTION

The sizing agent according to the present invention contains as the essential component a high molecular compound having an weight-average molecular weight of not less than 20,000 prepared by reacting.

(A) a polyhydroxy compound having an weight-average molecular weight of not less than 1,000, which is prepared by an addition polymerization of ethylene oxide or alkylene oxides comprising ethylene oxide to an organic compound having two active hydrogens, with (B) a polycarboxylic acid, a polycarboxylic acid anhydride or a lower ester of a polycarboxylic acid.

DETAILED DESCRIPTION OF THE INVENTION

Among the organic compounds having two active hydrogens used for producing the above polyhydroxy compound, there are included ethylene glycol, propylene glycol, butylene glycol, polyethylene glycol, polypropylene glycol, polybutylene glycol, butyl amine, polytetramethylene glycol, anilin and the like.

The polyhydroxy compound having an weight-average molecular weight of not less than 1,000 is obtained by addition-polymerizing to such an organic compound ethylene oxide alone or alkylene oxides comprising ethylene oxide. It is preferable for the polyhydroxy compound to comprise ethylene oxide units in an amount of at least 50%, particularly at least 70%.

As the alkylene oxide used together with ethylene oxide, there are exemplified propylene oxide, butylene oxide and the like.

The addition polymerization of ethylene oxide or alkylene oxides comprising ethylene oxide to the organic compound may be carried out by a known method.

The resultant polyhydroxy compound is required to have a weight-average molecular weight of not less than 1,000. The object of the present invention cannot be accomplished when the weight-average molecular weight is less than 1,000.

As the component (B) to be reacted with the polyhydroxy compound, there are included polycarboxylic acids, polycarboxylic anhydrides and lower alkyl esters of polycarboxylic acids, such as phthalic acid, isophthalic acid, terephthalic acid, sebacic acid, dimethyl esters or diethyl ester of the aforementioned acids, pyromellitic anhydride and the like.

The ester condensation reaction of the component (A), namely polyhydroxy compound having a weight-average molecular weight of not less than 1,000, with the component (B) such as polycarboxylic acids and the like is required to be carried out in a tightly closed vessel, because it tends to be accompanied with thermal decomposition.

The reaction ratio of the component (A) and the component (B) is optional. Any ratio may be used to make the weight-average molecular weight of the resultant high molecular compound not less than 20,000.

The sizing agent of the present invention contains as the essential component a high molecular compound prepared by an ester condensation reaction of the component (A) and the component (B). It is necessary for the high molecular compound to have a weight-average molecular weight of not less than 20,000, preferably 50,000 to 300,000. When the weight-average molecular weight is less than 50,000, the obtained film is poor in strength. On the other hand, when the weight-average molecular weight is more than 300,000, the obtained, the resultant solution has too high viscosity and the workablity is lowered.

Further, the sizing agent of the present invention may be used together with the other sizing agent such as starch, carboxymethyl cellulose, polyvinyl alcohol, polyacrylic acid and the like, if necessary.

Other additives such as plastisizers, emulsifiers, lubricants, antistatic agents and the like may be added to the sizing agent of the present invention.

Since the sizing agent of the present invention essentially comprises such a high molecular compound as described above, it has a high film-forming ability and is excellent in binder effect, fluff lay-down effect during weaving, lubricity, antistatic activity and the like. Further, it can be easily thermal decomposed in the deoilng process and can be almost completely removed at a low temperature.

Accordingly, glass clothes, roving clothes and the like woven with the use of the sizing agent of the present invention give no bad effect in the applications where the electric characteristics are important.

PREFERRED EMBODIMENTS OF THE INVENTION

The following examples serve to illustrate the invention in more detail although the invention is not limited to the examples. Unless otherwise indicated, parts and % signify parts by weight and % by weight, respectively.

EXAMPLE 1

2.2 parts of dimethyl terephthalate was mixed with 100 parts of polyethylene glycol having a weight-average molecular weight of 10,000 to obtain by an ester condensation reaction a high molecular compound A having a weight-average molecular weight of 130,000, and it was made into a 5% aqueous solution.

2% of hydrogenated castor oil was added to the aqueous solution as a lubricant and the mixture was applied on long glass fibers with a roll coater and then the fibers were collected to yarns and they were wound with a winder to give glass fiber yarns. A glass cloth was prepared from the glass fiber yarns.

The weaving process gave only little fluffs to get a good cloth.

Further, this cloth was almost completely de-oiled by baking at 350° C. for 5 hours.

COMPARATIVE EXAMPLE 1

Example 1 was repeated except that a modified starch was used instead of the high molecular compound A. In this case, heat and hours were required more than Example 1 to prepare the aqueous solution.

Further, when baked at 350° C. for 5 hours, some of the modified starch was left on the cloth as a carbide.

COMPARATIVE EXAMPLE 2

Example 1 was repeated except that a polyvinyl alcohol was used instead of the high molecular compound A. In this case, heat and hours were required more than Example 1 to prepare the aqueous solution.

Further, when baked at 350° C. for 5 hours, the polyvinyl alcohol was not substantially decomposed to leave a large amount of oil on the cloth.

EXAMPLE 2

Example 1 was repeated except that a high molecular compound B having a weight-average molecular weight of 200,000 which was prepared by an ester condensation reaction of an adduct of 1,900 parts of ethylene oxide and 100 parts of polypropylene glycol having a weight-average molecular weight of 2,000 with 20 parts of dimethyl sebacate was used instead of the high molucular compound A.

The weaving process was smoothly carried out same as in Example 1 to produce a good cloth. The cloth was almost completely de-oiled at 300° C.

EXAMPLE 3

Example 1 was repeated except that a high molecular compound C having a weight-average molecular weight of 170,000 which was prepared by an ester condensation reaction of an adduct of 300 parts of ethylene oxide and 100 parts of polybutylene glycol having a weight-average molecular weight of 5,000 with 4.6 parts of pyromellitic anhydride was used instead of the high molucular compound A.

The weaving process was smoothly carried out same as in Example 1 to produce a good cloth. The cloth was completely de-oiled at 350° C. for 2 hours.

The sizing agent of the present invention as obtained in Examples has many advantages as follows:
(1) It is easily soluble in cold water.
(2) Since the solution has a low viscosity and shows no roping, the workability is improved and excessive adhesion of the sizing agent can be prevented.
(3) It is superior in film-forming ability and gives a film easily even under highly humid condition to prevent abrasion between the filaments.
(4) It can be almost completely deoiled during thermal decomposition process even at a low temperature.
(5) Since it is easily soluble in water and solvents, it is possible to deoil with water, solvents, steam and the like.

Accordingly, the sizing agent of the present invention shows sizing ability with low fluffing and little end breakage. It can be also decomposed in the deoiling process at a low temperature for a short time. The resultant glass cloth, roving cloth and the like can be used for IC substrates, FRP and the like without lowering the electric characteristics.

What is claimed is:

1. A sizing agent for glass fibers, which contains as the essential component a high molecular compound having a weight-average molecular weight of not less than 20,000 prepared by reacting
   A. a polyhydroxing compound having a weight-average molecular weight of not less than 1,000, which is prepared by addition polymerization of at least one alkylene oxide to an organic compound selected from the group consisting of ethylene glycol, propylene glycol, polyethylene glycol, polypropylene glycol and polytetramethylene glycol, with
   B. a compound selected from the group consisting of phythalic acid, isophythalic acid, terephthalic acid, sebacic acid, dimethyl esters, or diethyl esters of the aforementioned acids, and pyromellitic anhydride
   said alkylene oxide essentially comprising ethylene oxide and optionally comprising propylene oxide and/or butylene oxide.

2. A sizing agent for glass fibers as defined in claim 1, wherein said high molecular compound has an weight-average molecular weight of 50,000 to 300,000.

3. A sizing agent for glass fibers as defined in claim 1, wherein said agent further comprises at least one of additives selected from the group consisting of plastisizers, emulsifiers, lubricants and antistatic agents.

4. A sizing agent for glass fibers as defined in claim 1, wherein said polyhydroxy compound comprises ethylene oxide units in an amount of at least 50% by weight.

* * * * *

UNITED STATES PATENT AND TRADEMARK OFFICE
CERTIFICATE OF CORRECTION

PATENT NO. : 4,968,776

DATED : November 6, 1990

INVENTOR(S) : Takeshi Fujita, et al.

It is certified that error appears in the above-identified patent and that said Letters Patent is hereby corrected as shown below:

COLUMN 4, Line 30;
Claim 1, line 5: delete "polyhydroxing" and insert therefor
--polyhydroxy--.

Signed and Sealed this

Twelfth Day of May, 1992

Attest:

DOUGLAS B. COMER

*Attesting Officer*     *Acting Commissioner of Patents and Trademarks*